March 12, 1957  G. LESSMAN  2,784,817
CLUTCH FOR SLIDE PROJECTORS
Filed May 6, 1953  3 Sheets-Sheet 1

INVENTOR.
GERHARD LESSMAN
BY
Clarence E. Threedy
HIS ATTORNEY.

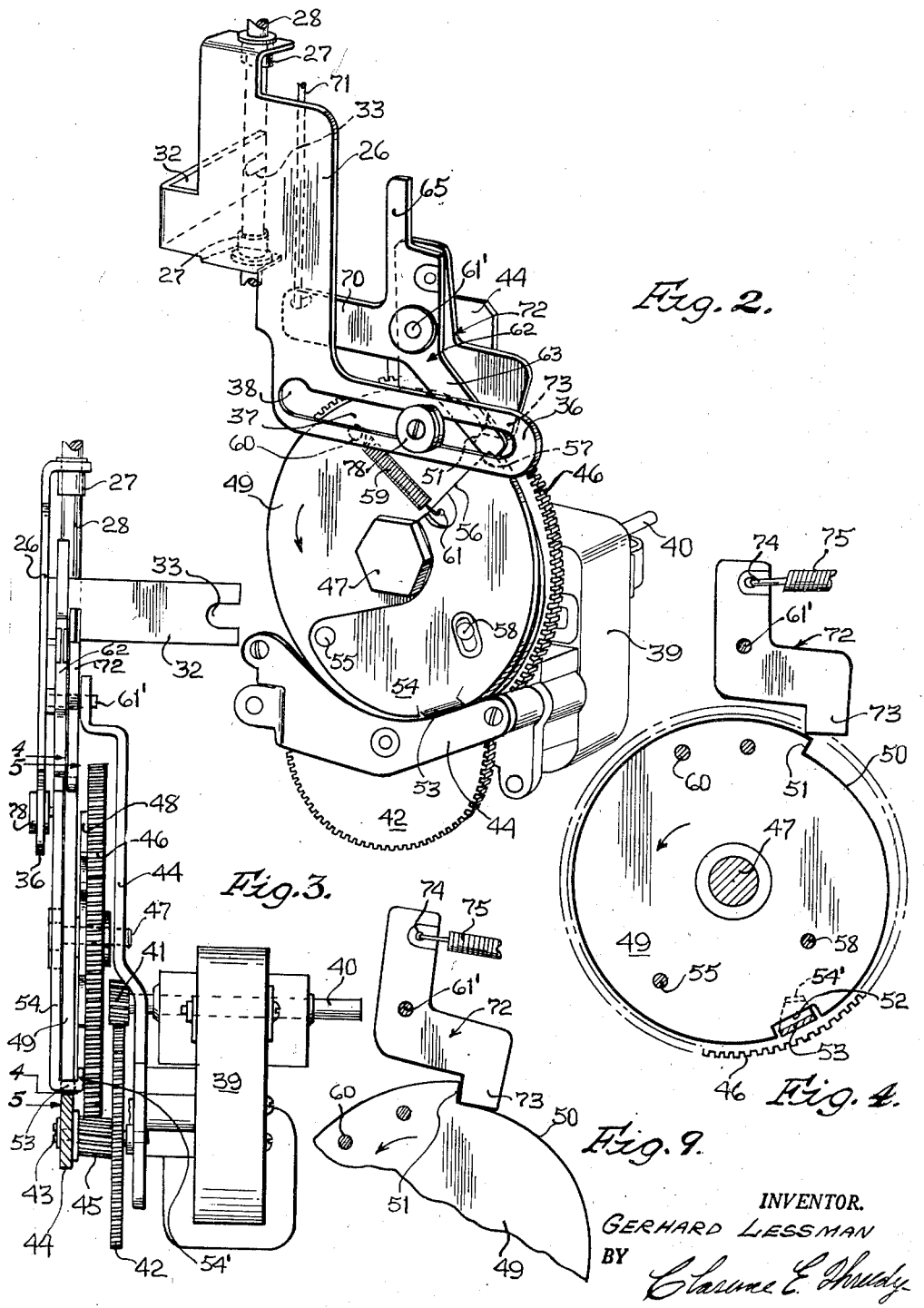

March 12, 1957
G. LESSMAN
2,784,817
CLUTCH FOR SLIDE PROJECTORS
Filed May 6, 1953
3 Sheets-Sheet 3
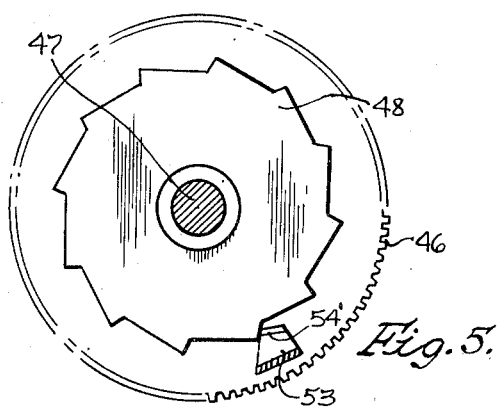
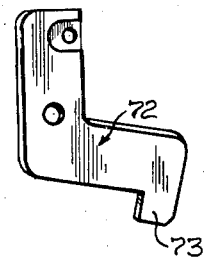
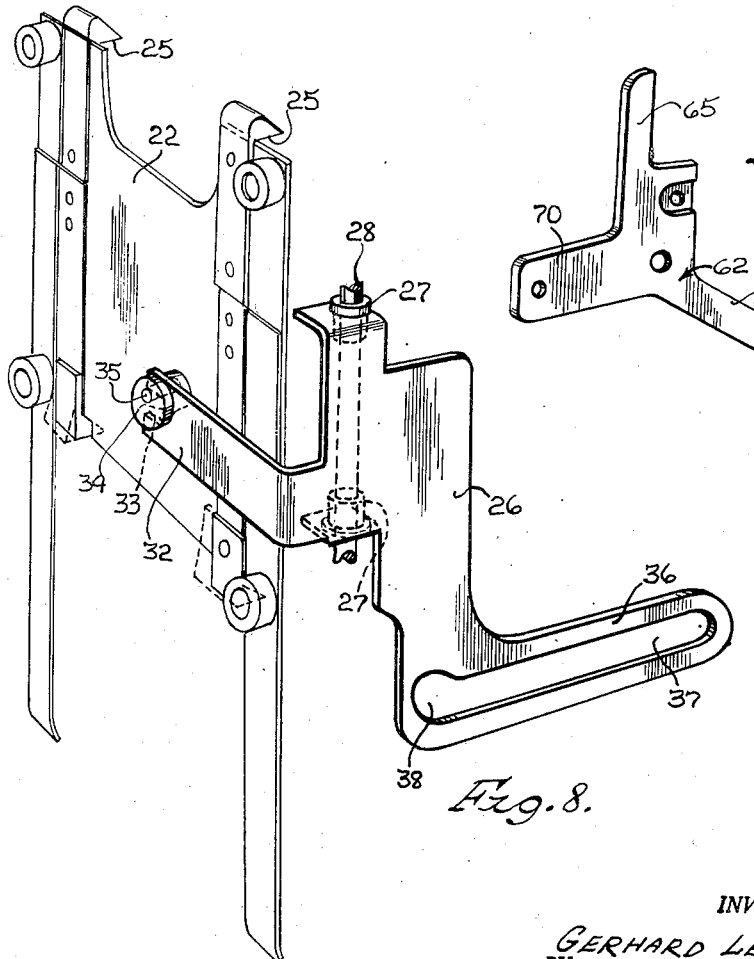
INVENTOR.
GERHARD LESSMAN
BY Clarence E. Ohmedy
HIS ATTORNEY.

United States Patent Office 2,784,817
Patented Mar. 12, 1957

2,784,817

CLUTCH FOR SLIDE PROJECTORS

Gerhard Lessman, Chicago, Ill., assignor to De Vry Corporation, Chicago, Ill., a corporation of Illinois Application May 6, 1953, Serial No. 353,389

4 Claims. (Cl. 192—28)

My invention relates to clutch for slide projectors and more particularly to a slide changing mechanism by which stereopticon slides may be moved into and from projection position.

One of the principal objects of this invention is the provision for remotely controlling the operation of the slide changing mechanism of a stereopticon slide projector.

Another and equally important object of the invention is the provision of a novel and effective clutch mechanism for operatively connecting power means with the follower of the slide changing mechanism.

Another object of the invention is to provide a clutch mechanism for the purposes above referred to which is silent in operation and one which may be controlled by the operator with a minimum degree of effort.

Yet another important object of my invention is the provision of a simple and easily operated mechanism for moving a stereopticon slide into and from projection position.

A still further object of the invention is to provide a slide changing mechanism for a stereopticon slide projector which comprises relatively few parts and one which therefore can be manufactured and assembled at the most economical cost.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 2 is a perspective view of the slide changing mechanism embodying my invention;

Fig. 3 is a side view of the same viewed as seen at the right hand side in Fig. 2;

Fig. 4 is a fragmentary sectional detail view taken substantially on line 4—4 of Fig. 3;

Fig. 5 is a sectional detail view taken substantially on line 5—5 of Fig. 3;

Fig. 6 is a perspective view of a disengaging pawl embodied in my invention;

Fig. 7 is a perspective view of a release pawl embodied in the invention;

Fig. 8 is a perspective view of the slide follower and actuating arm therefor embodied in my invention; and Fig. 9 is a fragmentary detail view similar to Fig. 4 but showing the parts therof in a different position.

Figure 1:
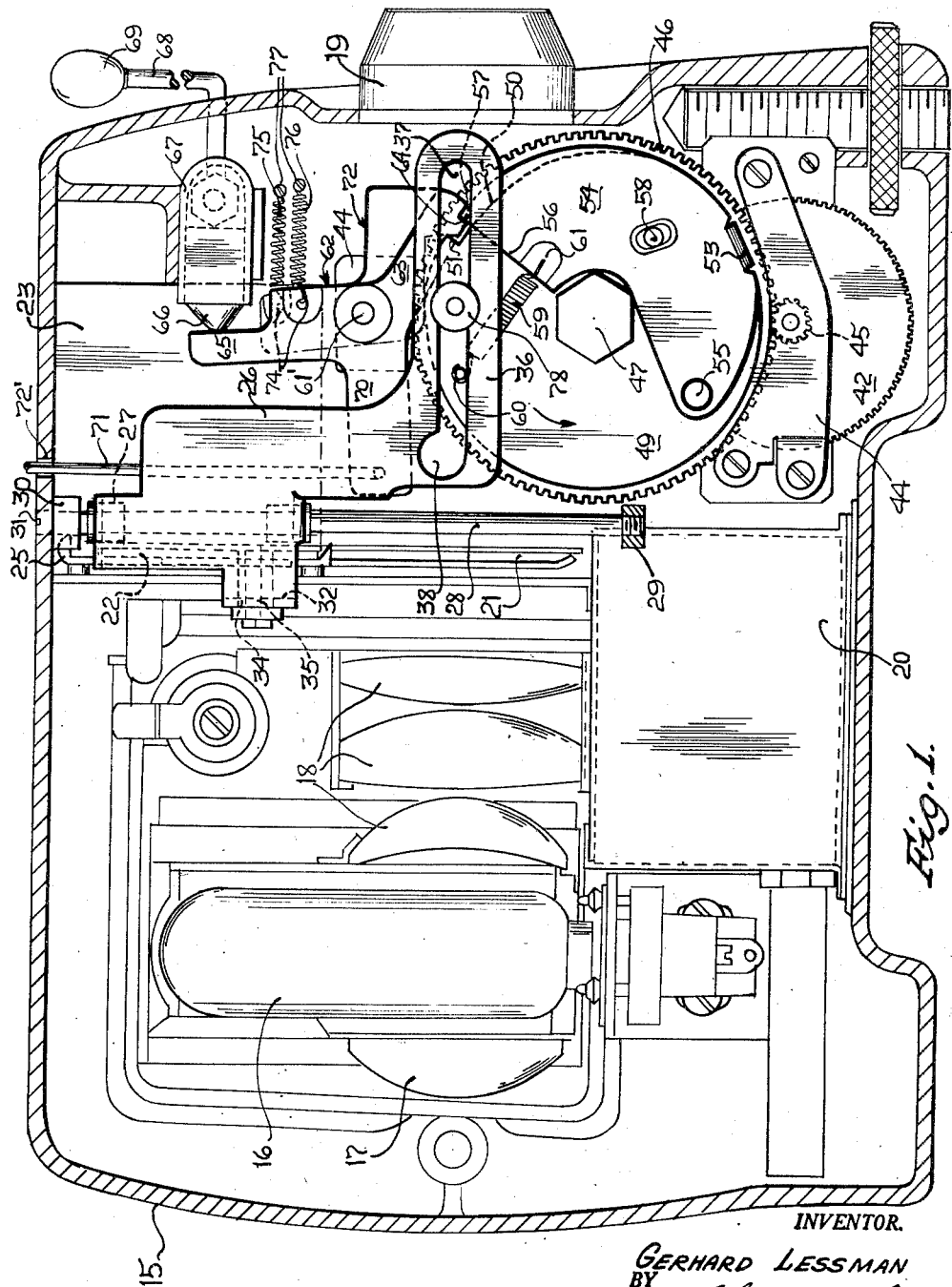
Fig. 1 is a vertical cross sectional detail view of a stereopticon slide projector showing my invention associated therewith.

The slide changing mechanism constituting my invention may be incorporated in slide projectors where it is required that a slide be moved from a storage chamber through a projection position and into a receiving chamber. Such a projector is illustrated and described in my pending application, Serial Number 296,688, filed July 1, 1952, now Patent No. 2,705,437. Only so much of the slide projector there shown and described is here illustrated as is necessary for a clear understanding of the present invention. For further information concerning the detailed construction of this slide projector, reference may be had to my aforesaid pending application.

As shown in such application the slide projector includes a housing or enclosure 15 which embodies the projecting mechanism including, among other things, a lamp 16, reflector lens 17, condenser lens 18 and a projector lens assembly 19 carried by the front wall of such housing.

A slide receiving compartment is indicated at 20. Into this compartment 20 the slides are received as they are moved successively from projection position indicated at 21. The slides are successively moved to this projecting position from a suitable storage compartment 23 such as is shown in my aforesaid pending application.

In accordance with my present invention these slides are successively moved into projection position by means of a follower 22 arranged for vertical slidable movement in a manner, preferably though not necessarily, as shown in my aforementioned application. The upper end portion of the follower 22 provides slide engaging fingers 25 which are adapted to engage the top edge of the slide to be moved to projection position.

The mechanism for moving the follower 22 comprises an arm assembly 26. This arm assembly 26 provides operatively spaced apart aligned bushings 27 slidably related to a guide rod 28. This guide rod 28 may be secured to a wall portion of the housing 15 in any approved manner.

In the present instance the lower end portion of the rod 28 is threaded into a boss 29 formed integral with an adjacent wall portion of the housing 15. The upper end portion of the rod slidably fits into a boss 30 formed integral with the housing 15. A screw slot 31 may be provided in the rod 28 to facilitate threading the lower end portion of such rod into the boss 29.

Included as a part of the arm assembly 26 is an integral rectangularly bent arm 32 provided at its outer end with an open slot 33 to embrace a stud 34 eccentrically connected to the follower 22 by a screw or bolt 35. By adjusting the stud 34 relative to its connecting means 35 the follower 22 may be adjusted relative to the arm 32 so as to properly position the slide engaging fingers of the follower 22 with respect to the top edge of the slide to be moved.

The arm assembly 26 also includes an integral laterally extending horizontally disposed arm 36. This arm 36 is disposed substantially at right angles with respect to the arm 32 and is provided with an elongated slot 37, one end of which terminates into a large opening 38.

It will be obvious that as the arm assembly 26 is moved vertically relative to the guide rod 28, movement will be imparted to the follower 22, to move a slide from the storage compartment 23 to projection position 21, in which latter position the slide will remain until it is moved by the next slide moved from the storage compartment 23 to projection position 21 by the follower 22.

The means for moving the arm assembly 26 relative to the guide rod 28 comprises a conventional motor 39. On the armature shaft 40 of such motor is a pinion 41. This pinion 41 meshes with a gear 42 mounted on a shaft 43 carried by a bracket structure 44 in turn carried by the motor frame of the motor 39. The gear 42 is fixed in any suitable manner to the shaft 43, to which shaft is also fixed a pinion 45 the latter operatively meshing with a driven gear 46. The gear 46 is fixed to a shaft 47 carried by the bracket structure 44. Fixed to this shaft 47 is a ratchet wheel 48. Mounted on the shaft 47 for rotation thereon is a clutch disc 49. This disc has a cam edge 50, the lower hill of which terminates into a shoulder 51. At a predetermined point on the periphery of the clutch disc 49 is formed a notch 52 providing a clearance for a finger 53. This finger 53 is formed as a part of a plate 54 having pivotal connection as at 55 to the clutch disc 49. This plate 54 has a flat straight edge 56 providing a shoulder 57 disposed adjacent and to one side of the shoulder 51. A slot and pin connection 58 provides a connection between the plate 54 and the disc 49 and serves to guide and limit the plate 54 in its pivotal movement relative to its pivotal connection 55 to the disc 49.

A spring 59 has one end connected at 60 to the disc 49 and the opposite end as at 61 to the plate 54. This spring functions to yieldably hold the plate 54 in a position relative to the disc 49 with the finger 53 positioned in the notch 52. The finger 53 provides a dog 54' which is disposed to engage the teeth of the ratchet wheel 48 under the action of the spring 59.

Journaled in the upper portion of the bracket 44 is a stud shaft 61'. Mounted on this stud shaft 61' is a release pawl 62. This pawl 62 provides an arm 63 (Fig. 7) the end of which is notched to provide a shoulder 64 adapted to engage the shoulder 57 of the plate 54. The release pawl 62 provides an arm 65 which is engageable by a plunger 66 slidably mounted in an air cylinder 67 and adapted to be moved outwardly with respect thereto under air pressure delivered to the cylinder 67 through a hose 68 from a manually compressible rubber bulb 69.

The release pawl 62 provides a laterally extending extension 70. To this extension 70 is attached a hand rod 71. This hand rod 71 extends exteriorly of the housing 15 through an opening 72'. On the end of this rod may be placed a finger button (not shown) whereby the releasing pawl 62 may be pivoted about its pivotal connection 61' independently of the action of the plunger 66.

Also pivoted on the stud shaft 61' is a pawl 72 having a depending finger 73 adapted to normally ride on the periphery of the disc 49 and to engage the shoulder 51 substantially at the end of one cycle of rotation of the gear 46 for reasons to be presently explained.

Secured to each of the pawls 62 and 72 are the corresponding end portions 74 of springs 75 and 76 having corresponding end portions connected as at 77 to an adjacent portion of the housing 15.

The disc 49 carries a grooved roller 78. The outside diameter of such roller 78 is such as to permit the roller to pass through the opening 38 for positioning in the slot 37 with adjacent edge portions of the arm 36 engaging in the grooves of such roller.

The parts of the slide moving mechanism are related to each other in a manner such that a slide is moved from the storage chamber to slide projection position upon each complete cycle of rotation of the gear 46. The slide moving mechanism operates as follows:

During the operation of the projector the motor 39 continuously rotates. When the follower 22 is disposed with the fingers 25 in engagement with a slide which is to be moved into projection position the pawl 62 will be in engagement with the shoulder 51 as shown in Fig. 9 and the pawl 72 will be in engagement with the shoulder 57. In this position of the pawl 72 the plate 54 will have been pivoted radially against the action of the spring 59 to the position where the dog 54' is disengaged from the ratchet wheel 48 so that the gear 46 while continuing to rotate will not rotate the disc 49 to effect movement of the follower 22.

To move the follower plate 22, the operator (assuming that the operator prefers to use the hand bulb 69 instead of the hand rod 71) will compress the bulb in his hand to create sufficient air pressure in the cylinder 67 to project the plunger 66 against the arm 65. The action of the plunger will pivot the arm in an anti-clockwise direction as viewed in Fig. 1, against the action of the spring 76. The plunger 66 is designed to pivot the release pawl 62 a sufficient distance in such direction so as to disengage the shoulder 64 from the shoulder 57 of the plate 54, thus to release the plate 54 for pivotal movement by the action of the spring 59.

The spring 59 will then pivot the plate 54 in a direction to engage the dog 54' with an adjacent tooth of the ratchet wheel 48. In this position of the dog with respect to the ratchet wheel 48 there is provided a connection between the driven gear 46 and the disc 49, the disc 49 rotating in the direction of the arrows shown in Figs. 1 and 2. As this disc 49 rotates in such direction the grooved roller 78 will act upon the arm 36 and initiate downward movement of the arm assembly to move the follower 22 to move a slide into projection position.

Simultaneously with this movement of the disc 49, the depending finger 73 of the pawl 72 will be caused to ride upon the cam edge 50 to pivot the pawl 72 in an anti-clockwise direction as viewed in Fig. 4 against the action of the spring 75. When the gear 46 is about to reach the end of one cycle of rotation the shoulder 57 of the plate 54 will be brought into engagement with the shoulder 64 of the pawl 62 whereby upon continued rotation of the gear 46 by the motor 39, the plate 54 will be pivoted in a clockwise direction to disengage the dog 54' from the tooth of the ratchet wheel 48, at which time the disc 49 will be disconnected for rotation with the gear 46.

Substantially simultaneously with the engagement of the dog 62 with the plate 54, the pawl 72 will pivot under the action of the spring 75 to a position to dispose the finger 73 in engagement with the shoulder 51. As the spring 75 is under tension, it will force the finger 73 against the shoulder 51 with the result that the disc 49 will be rotated a predetermined distance beyond an otherwise position of rest were it not for the forcing action of the spring-powered finger 73 against the shoulder 51 slightly prior to the disc 49 reaching such otherwise position of rest. Such arrangement accelerates the disengagement of the dog 54' from the ratchet wheel 48 thereby avoiding clashing between the dog 54' and such wheel which would otherwise result were it not for this accelerated disengagement of the dog 54' from the ratchet wheel.

To permit the disc 49 to again rotate by action of the motor 39, the pawl 62 is released from the plate 54 by the action of the plunger 66 and the finger 73 will again be pivoted to place the spring 75 under tension by engagement of such finger with the cam edge 50.

By the foregoing arrangement I have provided a novel clutch assembly which is silent and effective in operation for successively moving slides into projection position.

As hereinbefore suggested, should the operator desire to release the parts for slide moving operation other than through the compression of the bulb 59, he may do so by manually moving the rod 71 downwardly as viewed in Fig. 1, at which time the function of the respective parts of the slide moving mechanism will take place in the manner hereinbefore described.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A clutch for the purposes herein described comprising, in combination with a normally continuously operating motor and a driven gear having driving connection with the motor, a ratchet wheel connected for rotation with the gear, a clutch disc, a dog member pivotally carried by the clutch disc for rotation therewith and adapted to be moved transversely with respect to one side of the disc to engage the ratchet wheel, means yieldably retaining said dog member in engagement with the ratchet wheel, spring-actuated means adapted for engagement with said dog member to pivot the same from engagement with the ratchet wheel at the end of one cycle of rotation of said motor, said disc having a peripheral cam edge portion terminating at its lower hill into a shoulder, a spring-urged member having a shoulder engageable with the shoulder of said disc at the end of the cycle of rotation of said motor for continuing the rotation of said disc a predetermined distance to accelerate pivotal movement of said dog when in engagement with said ratchet wheel, said spring-urged member riding said cam edge portion and pivoted thereby from engagement with said shoulder at the lower hill of said cam edge portion, and means acting upon said spring-actuated means to release the dog member for movement into engagement with the ratchet wheel to permit the motor to start a new cycle of rotation.

2. A clutch for the purposes herein described comprising, in combination with a normally continuously operating motor and a driven gear having driving connection with the motor, a ratchet wheel connected for rotation with the gear, a clutch disc, a dog member pivotally carried by the clutch disc for rotation therewith and adapted to be moved transversely with respect to one side of the disc to engage the ratchet wheel, means yieldably retaining said dog member in engagement with the ratchet wheel, spring-actuated means adapted for engagement with said dog member to pivot the same from engagement with the ratchet wheel at the end of the cycle of rotation of said motor, said disc having a peripheral cam edge portion terminating at its lower hill into a shoulder, a spring-urged member having a shoulder engageable with the shoulder of said disc at the end of the cycle of rotation of said motor for continuing the rotation of said disc a predetermined distance to accelerate pivotal movement of said dog when in engagement with said ratchet wheel, said spring-urged member riding said cam edge portion and pivoted thereby from engagement with said shoulder at the lower hill of said cam edge portion, and pneumatic means acting upon said spring-actuated means to release the dog member for movement into engagement with the ratchet wheel to permit the motor to start a new cycle of rotation.

3. A clutch for the purposes herein described comprising, in combination with a normally continuously operating motor and a driven gear having driving connection with the motor, a ratchet wheel connected for rotation with the gear, a clutch disc, a dog member pivotally carried by the clutch disc for rotation therewith and adapted to be moved transversely with respect to one side of the disc to engage the ratchet wheel, means yieldably retaining said dog member in engagement with the ratchet wheel, spring-actuated means adapted for engagement with said dog member to pivot the same from engagement with the ratchet wheel at the end of the cycle of rotation of said motor, said disc having a peripheral cam edge portion terminating at its lower hill into a shoulder, a spring-urged member having a shoulder engageable with the shoulder of said disc at the end of the cycle of rotation of said motor for continuing the rotation of said disc a predetermined distance to accelerate pivotal movement of said dog when in engagement with said ratchet wheel, said spring-urged member riding said cam edge portion and pivoted thereby from engagement with said shoulder at the lower hill of said cam edge portion, and pneumatic remotely controlled means acting upon said spring-actuated means to release the dog member for movement into engagement with the ratchet wheel to permit the motor to start a new cycle of rotation.

4. A clutch for the purposes herein described comprising, in combination with a normally continuously operating motor and driven gear having driving connection with the motor, a ratchet wheel connected for rotation with the gear, a clutch disc, a dog member pivotally carried by the clutch disc for rotation therewith and adapted to be moved transversely with respect to one side of the disc to engage the ratchet wheel, means yieldably retaining said dog member in engagement with the ratchet wheel, a spring-actuated pawl adapted for engagement with said dog member to pivot the same from engagement with the ratchet wheel at the end of one cycle of rotation of said motor, said disc having a peripheral cam edge portion terminating at its lower hill into a shoulder, a spring-urged member having a shoulder engageable with the shoulder of said disc at the end of the cycle of rotation of said motor for continuing the rotation of said disc a predetermined distance to accelerate pivotal movement of said dog when in engagement with said ratchet wheel, said spring-urged pawl riding said cam edge portion and pivoted thereby from engagement with said shoulder at the lower hill of said cam edge portion.

References Cited in the file of this patent

UNITED STATES PATENTS

| | | |
|---|---|---|
| 919,006 | Hancock | Apr. 20, 1909 |
| 1,435,319 | Messer | Nov. 14, 1922 |
| 1,904,622 | Krueger et al. | Apr. 18, 1933 |
| 1,997,682 | Emery | Apr. 16, 1935 |
| 2,048,194 | Moreno | July 21, 1936 |
| 2,171,467 | Zeruneith | Aug. 29, 1939 |
| 2,363,820 | Warriner | Nov. 28, 1944 |
| 2,633,957 | Gardinor et al. | Jan. 19, 1950 |